US006879387B2

(12) United States Patent
Paduch

(10) Patent No.: US 6,879,387 B2
(45) Date of Patent: Apr. 12, 2005

(54) POLARIZATION DEPENDENT RETURN LOSS MEASUREMENT

(75) Inventor: Alexandre Paduch, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 2 days.

(21) Appl. No.: 10/407,859

(22) Filed: Apr. 4, 2003

(65) Prior Publication Data

US 2004/0196449 A1 Oct. 7, 2004

(51) Int. Cl.$^7$ ............................................. G01N 21/00
(52) U.S. Cl. ................................................... 356/73.1
(58) Field of Search ........................ 356/73.1, 44, 479; 385/134, 100, 50–78, 33–38, 80, 85, 92; 250/227.11–227.28

(56) References Cited

U.S. PATENT DOCUMENTS 5,864,400 A * 1/1999 Bottazzi et al. .............. 356/451
6,580,498 B1 * 6/2003 Harley ....................... 356/73.1

* cited by examiner

Primary Examiner—Tu T. Nguyen

(57) ABSTRACT

The present invention relates to an apparatus and to a method of optical characterization of a DUT by measurement of its optical return loss, comprising the steps of: providing an incident polarized optical signal to the DUT, detecting a reflected power of a reflected optical signal reflected by the DUT as a function of the polarization of the incident optical signal, and evaluating the optical return loss of the DUT as a function of the polarization of the incident optical signal on the basis of the detected reflected power.

22 Claims, 3 Drawing Sheets

US 6,879,387 B2

POLARIZATION DEPENDENT RETURN LOSS MEASUREMENT

BACKGROUND OF THE INVENTION

The present invention relates to optical characterization of a device under test. (DUT) by measurement of its optical return loss, especially its wavelength dependent optical return loss.

A measurement of optical return loss provides an optical signal with a certain incident optical power to the DUT and measures the fraction of the incident optical power that is reflected by the DUT. This fraction gives the optical return loss of the DUT. The measurement can be done while changing the wavelength of the optical signal to provide the optical return loss of the DUT as a function of the wavelength of the optical signal.

However, known measurement techniques (e.g. as disclosed in "Dennis Derickson, Fiber Optic Test and Measurement, Prentice Hall PTR, New Jersey, USA, 1998, pages 387–390") show unwanted residual reflectivities of the measurement setup which limit the measurement range of such measurements to reflectivities of the DUT which are greater than the residual reflectivities.

SUMMARY OF THE INVENTION

It is an object of the invention to provide improved optical characterization of a DUT when measuring its optical return loss, especially its wavelength dependent optical return loss. The object is solved by the independent claims.

The invention comprises the perception that the return loss of the DUT can be dependent on the polarization of the optical signal, also. Therefore, preferred embodiments of the invention use an optical signal having a known polarization to be able to measure the optical return loss of the DUT as a function of the polarization of the optical signal.

Even more preferred the optical return loss of the DUT is measured by using at least three, preferably four, different states of polarization (SOP) of the incident optical signal and detecting the respective powers of the reflected optical signal reflected by the DUT as a function of the SOP. Then the optical return loss as a function of the polarization of the incident optical signal can be derived from the four different results by using the Mueller matrix method as described below in further detail.

Moreover, the invention comprises the perception that a limit of a measurement range of a measurement of optical return loss of a DUT can be polarization dependent due to unwanted polarization dependent reflections occurring at couplers used in the setup. Therefore, preferred embodiments of the invention perform a polarization dependent correction of the resulting return loss.

Additionally, the invention comprises the perception that the directivity of a coupler can be polarization dependent, also, and that an uncertainty of a measurement of optical return loss of a DUT can mainly be due to such polarization dependent directivity of the coupler. Couplers are connected with an optical source to provide the optical signal, the DUT and a power meter to measure the reflected fraction of the incident power of the optical signal, and which direct the optical signal of the optical source to the DUT and the reflected optical signal to the power meter. Therefore, preferred embodiments of the invention perform a polarization dependent directivity correction of the resulting return loss.

Other preferred embodiments of the present invention are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considered in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
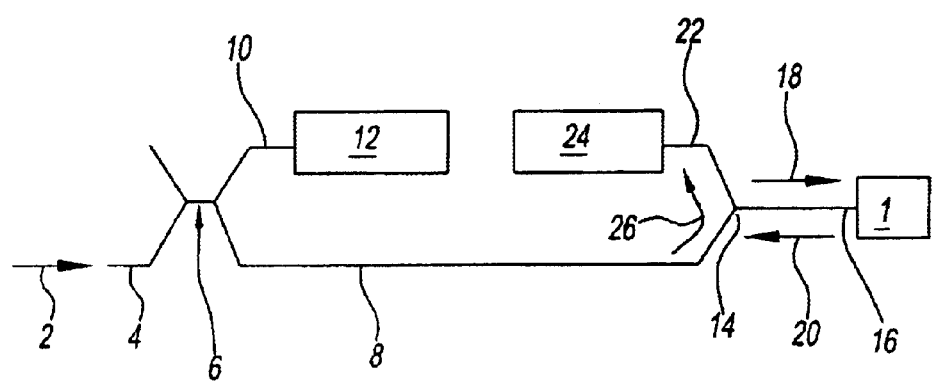
FIG. 1 shows a schematic illustration of a classical setup for measuring optical return loss of a DUT.

Referring now in greater detail to the drawings, FIG. 1 shows a schematic illustration of a classical setup for measuring optical return loss of a DUT 1. An incident optical signal 2 is provided to an optical fiber 4, which is connected to a coupler 6, which couples the optical signal in optical fiber 8 and in optical fiber 10. Optical fiber 10 is connected to a monitoring power meter 12. Optical fiber 8 is connected to a coupler 14, which couples the incoming optical signal 2 via a fiber 16 connected to the DUT 1 according to arrow 18. DUT 1 reflects the incoming optical signal and sends back a fraction of the incoming optical signal according to arrow 20 to the coupler 14. Coupler 14 couples this reflected optical signal 20 via a fiber 22 to a reflection power meter 24.

However, some of the incoming optical signal 2 is coupled by the coupler 14 direct into the reflection power meter 24 according to arrow 26.

A classical technique of return loss measurement using the setup of FIG. 1 uses the following steps and parts:
1) A reference (not shown), e.g. a mirror (or a component with a known optical return loss (RL), RL=Rlref (dB)), with very low polarization dependent loss (PDL).
2) A termination (not shown) for referencing the noise on the reflection power meter 24 by connecting the termination instead of the DUT 1.
3) connecting of the DUT 1 to the measurement setup.

The following table illustrates the used variable for each component:

| Connected optical component | Variable name of power measured on reflection power meter | Variable name of power measured on monitoring power meter |
|---|---|---|
| Reference (with RL = RL$_{ref}$) | P$_{ref}$ | P$_{mon,ref}$ |

-continued

| Connected optical component | Variable name of power measured on reflection power meter | Variable name of power measured on monitoring power meter |
| --- | --- | --- |
| Termination | $P_{noise}$ | $P_{mon,noise}$ |
| DUT 1 | $P_{dut}$ | $P_{mon,dut}$ |

The theoretical RL measurement equation is:

$$RL_{DUT} = -10 \cdot \log\left(\frac{P_{DUT}}{P_{REF}}\right) + RL_{ref}$$

In order to increase measurement range and optical return loss uncertainty, the noise power due to directivity 26 of coupler 14 is substracted from the measured power and the reference power.

$$RL_{DUT} = -10 \cdot \log\left(\frac{P_{DUT} - P_{noise}}{P_{REF} - P_{noise}}\right) + RL_{ref}$$

Then a monitoring correction is performed according to the following formula:

$$RL_{DUT} = -10 \cdot \log\left(\frac{P_{DUT} - \frac{P_{mon,dut}}{P_{mon,noise}} P_{noise}}{P_{REF} - \frac{P_{mon,ref}}{P_{mon,noise}} P_{noise}}\right) + RL_{ref}$$

However, PDL of coupler 14 is a main source of inaccuracy when measuring optical return loss according to the aforementioned classical technique.

Moreover, a main dynamic range limitation source when measuring optical return loss according to the aforementioned classical technique is also the directivity of coupler 14, i.e. imperfect noise correction of noise caused by unknown directivity oscillations of the coupler 14 dependent on the polarization of the incident optical signal 2.

Figure 2:
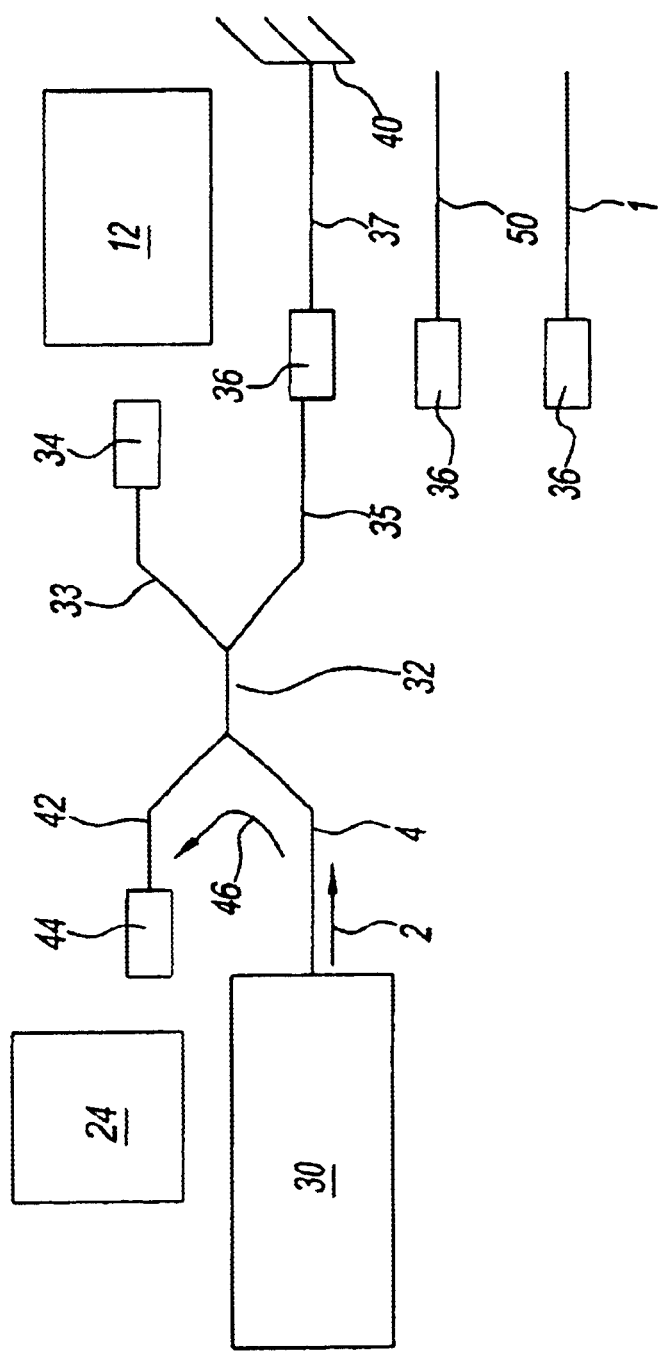
FIG. 2 shows a schematic illustration of an embodiment of the present invention.

To correct the aforementioned effects the inventive embodiment of FIG. 2 measures the RL in a polarization dependent manner and measures the directivity noise of coupler 14 in a polarization dependent manner, also. The function of the embodiment of FIG. 2 and the mathematics involved in the evaluation of the polarization depentent RL will be explained in the following: According to this embodiment the Mueller matrix method for the transmission loss measurements is applied to the above classical method for a reflection measurement.

As technical background information it has to be said that the Mueller matrix method is one of three commonly used methods for measuring transmission loss or for measuring PDL in transmission. The Mueller matrix method preferably measures four different losses in four different SOP. This measurement can be monitored with a use of a coupler before a DUT. This coupler has a PDL (commonly ~100 mdB) but its impact on the PDL accuracy is very low (its PDL is referenced out, the only effect is the polarization rotation due to its PDL).

FIG. 2 shows a schematic illustration of the aforementioned inventive embodiment which measures the return loss in a polarization dependent manner. FIG. 2 comprises a tunable light source 30 comprising a polarization controller that provides the optical signal with a defined state of polarization. The tunable light source 30 is connected with optical fiber 4 which is connected to a coupler 32. Coupler 32 provides the optical signal 2 via fiber 33 and connector 34 to a monitoring power meter 12 and via fiber 35 and connector 36 to a fiber 37 which is connected to a reference 40, e.g., a reflector. Reference 40 has an at least approximately known optical return loss. The reference 40 has an optical return loss that is very low compared to the optical return loss of the DUT 1, preferably at least 10 dB lower, more preferably at least 20 dB lower. Preferably, reference 40 can be considered as being a 100% reflective reference.

As an alternative a straight connector end reflex with approximately 14 dB return loss can be used as a reference 40 for example. Then the optical return loss of reference 40 cannot be considered as being a 100% reflective reference anymore. However, this does not reduce the accuracy of any measurement result as long as the optical return loss of reference 40 is known.

The optical signal reflected by reference 40 is provided by coupler 32 via a fiber 42 and a connector 44 to the reflection power meter 24.

However, some of the incident optical power of the optical signal 2 goes directly into reflection power meter 24 according to arrow 46.

Reference 40 serves as a calibration object for calibrating the measurement setup according to FIG. 2, i.e. to calibrate reflection power meter 24 by using a reference 40 having a known return loss. Connecting fiber 37 and reference 40 can be replaced by a termination 50. Termination 50 serves to define a polarization dependent effect, e.g., polarization dependent noise or unwanted loss 46, of coupler 32. Termination 50 has also a defined optical loss which is very high compared to the optical loss of DUT 1. The optical loss of termination 50 is about 70 dB which corresponds to a return loss coefficient of $10^{-7}$. However, the optical loss of termination 50 preferably should be greater than 50 dB. Moreover, the return loss of termination 50 preferably should be greater than any directivity of coupler 32 measured in decibel.

For determination of the polarization dependent optical return loss of DUT 1 termination 50 or reference 40 are replaced by DUT 1 according to FIG. 2, i.e. DUT 1 is connected via connector 36 to fiber 35.

Since in the RL measurement according to the embodiment of FIG. 2 the light travels through the coupler 32 also after reflection on the DUT 1, the PDL of coupler 32 can't be referenced out. Therefore, for PDL accuracy, it is preferred that coupler 32 has a low PDL and high directivity for dynamic range performance.

It is preferred using any enhancement concept for avoiding PDL error sources or interference effects in the setup, e.g. using light depolarization, antireflection connectors to power meter, zero PDL couplers and/or zero PDL power meters.

It follows a description of the mathematics of a transmission loss or transmission PDL measurement according to the Mueller matrix method.

Stokes vector:

$$S = \begin{pmatrix} Sa \\ Sb \\ Sc \\ Sd \end{pmatrix}$$

where Sa is the power of the light 2, Sb, Sc and Sd the proportion of Linear horizontal (0°), Linear vertical (90°), Linear diagonal (45°) and right hand circular light polarization. Be aware of the Mueller Matrix principle: launching four different light signals 2 at four different SOP. That gives:

$$SI_{in} = \begin{pmatrix} P1 \\ P1 \\ 0 \\ 0 \end{pmatrix}, S2_{in} = \begin{pmatrix} P2 \\ -P2 \\ 0 \\ 0 \end{pmatrix}, S3_{in} = \begin{pmatrix} P3 \\ 0 \\ P3 \\ 0 \end{pmatrix}, S4_{in} = \begin{pmatrix} P4 \\ 0 \\ 0 \\ P4 \end{pmatrix}$$

the output power of the DUT is measured for each state of polarization:

$$S1_{out} = \begin{pmatrix} P1_{out} \\ ? \\ ? \\ ? \end{pmatrix}, S2_{out} = \begin{pmatrix} P2_{out} \\ ? \\ ? \\ ? \end{pmatrix},$$

$$S3_{out} = \begin{pmatrix} P3_{out} \\ ? \\ ? \\ ? \end{pmatrix}, S4_{out} = \begin{pmatrix} P4_{out} \\ ? \\ ? \\ ? \end{pmatrix}$$

$S_{out} = M \cdot S_{in}$, where M is the 4×4 Mueller Matrix of the DUT 1, $m_{ij}$ its 16 coefficients.

By applying this equation to the first row of the matrix, it comes:

$$\begin{pmatrix} P1_{out} \\ P2_{out} \\ P3_{out} \\ P4_{out} \end{pmatrix} = \begin{pmatrix} m_{11}+m_{12} \\ m_{11}-m_{12} \\ m_{11}+m_{13} \\ m_{11}+m_{14} \end{pmatrix} \cdot \begin{pmatrix} P1 \\ P2 \\ P3 \\ P4 \end{pmatrix}$$

Maximum and minimum transmission gives:

$$T_{max} = m_{11} + \sqrt{m_{11}^2 + m_{12}^2 + m_{13}^2}$$

$$T_{min} = m_{11} - \sqrt{m_{11}^2 + m_{12}^2 + m_{13}^2}$$

$$\Rightarrow PDL_{dB} = 10 \cdot \log\left(\frac{T_{max}}{T_{min}}\right)$$

$$\rightarrow Loss_{dB} = -10 \cdot \log(m_{11})$$

Using the Mueller matrix method in reflection, the PDL can be determined in reflection, and loss can be determined for non polarized light.

Exactly like for return loss measurement, the power measurement of the PDL transmission measurement can be monitored, and directivity noise power can be substracted.

Below, there is provided a description of the algorithms involved in the monitoring and directivity noise correction according to the embodiment of FIG. 2. The following table illustrates the used variable for each component:

| Connected optical component | Variable name on reflection power meter @ SOP (1 ... 4) | Variable name on monitoring power meter @ SOP (1 ... 4) |
|---|---|---|
| Reference (with RL = RL$_{ref}$) 40 | P$_{ref}$(1 ... 4) | P$_{mon,ref}$(1 ... 4) |
| Termination 50 | P$_{noise}$(1 ... 4) | P$_{mon,noise}$(1 ... 4) |
| DUT 1 | P$_{dut}$(1 ... 4) | P$_{mon,dut}$(1 ... 4) |

For the basic mathematical algorithm it is considered that the reference is made "relatively to the reference device", which means that the reference 40 is considered ideally 100% reflective (RL$_{ref}$=0 dB):

$$\begin{pmatrix} P_{dut}(1) \\ P_{dut}(2) \\ P_{dut}(3) \\ P_{dut}(4) \end{pmatrix} = \begin{pmatrix} m_{11}+m_{12} \\ m_{11}-m_{12} \\ m_{11}+m_{13} \\ m_{11}+m_{14} \end{pmatrix} \cdot \begin{pmatrix} P_{ref}(1) \\ P_{ref}(2) \\ P_{ref}(3) \\ P_{ref}(4) \end{pmatrix}$$

It follows a monitoring correction according to the following formula:

$$\begin{pmatrix} P_{dut}(1) \\ \ldots \\ \ldots \\ P_{dut}(4) \end{pmatrix} = \begin{pmatrix} m_{11}+m_{12} \\ m_{11}-m_{12} \\ m_{11}+m_{13} \\ m_{11}+m_{14} \end{pmatrix} \cdot \begin{pmatrix} \frac{P_{mon,dut}(1)}{P_{mon,ref}(1)} \cdot P_{ref}(1) \\ \ldots \\ \ldots \\ \frac{P_{mon,dut}(4)}{P_{mon,ref}(4)} \cdot P_{ref}(4) \end{pmatrix}$$

Then it follows a directivity correction according to the following formula:

$$\begin{pmatrix} P_{dut}(1) - \frac{P_{mon,dut}(1)}{P_{mon,noise}(1)} \cdot P_{noise}(1) \\ \ldots \\ \ldots \\ P_{dut}(4) - \frac{P_{mon,dut}(4)}{P_{mon,noise}(4)} \cdot P_{noise}(4) \end{pmatrix} =$$

$$\begin{pmatrix} m_{11}+m_{12} \\ m_{11}-m_{12} \\ m_{11}+m_{13} \\ m_{11}+m_{14} \end{pmatrix} \cdot \begin{pmatrix} \frac{P_{mon,dut}(1)}{P_{mon,ref}(1)} \cdot \left\{ P_{ref}(1) - \frac{P_{mon,ref}(1)}{P_{mon,noise}(1)} \cdot P_{noise}(1) \right\} \\ \ldots \\ \ldots \\ \frac{P_{mon,dut}(4)}{P_{mon,ref}(4)} \cdot \left\{ P_{ref}(4) - \frac{P_{mon,ref}(4)}{P_{mon,noise}(4)} \cdot P_{noise}(4) \right\} \end{pmatrix}$$

With a golden reflector being used as reference 40, $P_{ref} \gg P_{noise}$, (conditions on high directivity and on coupling ratio of coupler 32). Moreover the division between two monitoring powers should be close to one (conditions on setup rough stability). Therefore, one can make the approximation;

$$P_{ref}(i) - \frac{P_{mon,ref}(i)}{P_{mon,noise}(i)} \cdot P_{noise}(i) \approx P_{ref}(i)$$

So the simplified equation becomes:

$$\begin{pmatrix} P_{dut}(1) - \frac{P_{mon,dut}(1)}{P_{mon,noise}(1)} \cdot P_{noise}(1) \\ \ldots \\ \ldots \\ P_{dut}(4) - \frac{P_{mon,dut}(4)}{P_{mon,noise}(4)} \cdot P_{noise}(4) \end{pmatrix} = \begin{pmatrix} m_{11}+m_{12} \\ m_{11}-m_{12} \\ m_{11}+m_{13} \\ m_{11}+m_{14} \end{pmatrix} \cdot \begin{pmatrix} \frac{P_{mon,dut}(1)}{P_{mon,ref}(1)} \cdot P_{ref}(1) \\ \ldots \\ \ldots \\ \frac{P_{mon,dut}(4)}{P_{mon,ref}(4)} \cdot P_{ref}(4) \end{pmatrix}$$

Figure 3:
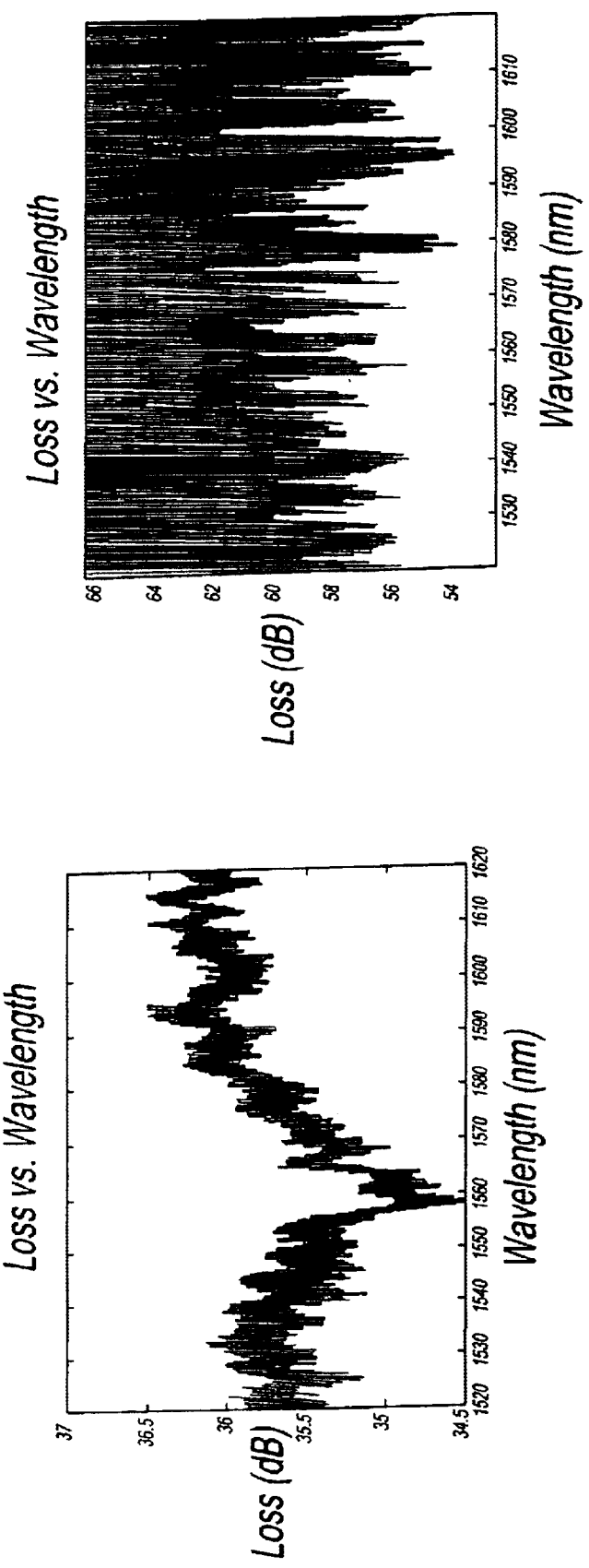
FIG. 3 shows two graphs displaying the effect of a correction of the measured optical return loss for noise power, by displaying the measured optical return loss with (left) and without (right) the application of correction.

FIG. 3 shows two graphs displaying the effect of a correction of the measured optical return loss for noise power, by displaying the measured noise power with (left) and without (right) the application of correction to have an estimation of the measurement range increase due to directivity correction according to the embodiment of FIG. 2. It was used a coupler with 46 dB directivity and a coupling ratio between DUT and power meter of 11.3 dB, with an excess loss of 1 dB. The measurement range without correction was 34.5 dB, the measurement range with correction was 54.5 dB. Therefore a measurement range increase of 20 dB could be achieved.

What is claimed is:

1. A method of optical characterization of a DUT by measurement of its optical return loss, comprising the steps of:
   a) providing to the DUT, a first incident optical signal having a first state of polarization;
   b) detecting a first reflected power of a first reflected optical signal reflected by the DUT as a function of the first state of polarization;
   c) providing, to the DUT, a second incident optical signal having a second state of polarization;
   d) detecting a second reflected power of a second reflected optical signal reflected by the DUT as a function of the second state of polarization; and
   e) evaluating the optical return loss of the DUT as a function of the first and second states of polarization on the basis of the first and second detected reflected powers.

2. The method of claim 1, further comprising the steps of:
   evaluating an optical return loss of a reference having an at least approximately known optical return loss by performing steps a) to e) with the reference instead of the DUT; and
   calibrating the measurement of the optical return loss based on the optical return loss of the reference.

3. The method of claim 2, wherein the optical return loss of the reference is at least 10 dB lower than the optical return loss of the DUT.

4. The method of claim 1, further comprising the steps of:
   performing a polarization dependent correction of the evaluated optical return loss to compensate polarization dependent effects influencing the measurement result by performing steps a) to e) with a termination having an at least approximately known optical return loss instead of the DUT.

5. The method of claim 4, wherein the optical return loss of the termination is at least 10 dB higher than the optical return loss of the DUT.

6. The method of claim 1, further comprising the steps of:
   performing a polarization dependent directivity correction of the resulting optical return loss to compensate a polarization dependent directivity of any coupler used for the measurement by performing steps a) to e) with a termination instead of the DUT, wherein the termination has an optical return loss that is at least 10 dB higher than the optical return loss of the DUT.

7. The method of claim 1, further comprising the steps of:
   monitoring an incident power of at least one of the first and second incident optical signals.

8. The method of claim 1, further comprising the steps of:
   tuning the wavelength of at least one of the first and second incident optical signals when performing the measurement to be able to evaluate a wavelength dependent optical return loss of the DUT.

9. The method of claim 1, further comprising the steps of:
   monitoring the wavelength of at least one of the first and second incident optical signals.

10. The method of claim 1, further comprising the steps of:
    simultaneously performing a transmission measurement of an optical loss of the DUT in transmission by:
    detecting a transmitted power of an optical signal transmitted by the DUT as a function of the first and second states of polarization; and
    evaluating the optical loss of the DUT in transmission as a function of the first and second states of polarization on the basis of the detected transmitted power.

11. A software program or product, preferably stored on a data carrier, for executing the method of claim 1 when run on a data processing system.

12. A method of optical characterization of a DUT by measurement of its optical return loss, comprising the steps of:
    (i) for each of a first state of polarization (SOP), a second SOP, a third SOP and a fourth SOP, wherein each of the second, third and fourth SOPs is different from the first SOP:
       a) providing an incident polarized optical signal to the DUT; and
       b) detecting a reflected power of an reflected optical signal reflected by the DUT as a function of the polarization of the incident polarized optical signal; and
    (ii) evaluating the optical return loss of the DUT as a function of the polarization of the incident polarized optical signal on the basis of the detected reflected powers for each of the first, second, third and fourth SOPs using a Mueller matrix method.

13. An apparatus for optical characterization of a DUT by measurement of its optical return loss, comprising:
    a polarization controller for controlling a polarization of an incident optical signal to the DUT to provide a first incident optical signal having a first state of polarization and a second incident optical signal having a second state of polarization;
    a detector for detecting a first reflected power of a first reflected optical signal reflected by the DUT as a function of the first state of polarization, and detecting a second reflected power of a second reflected optical signal reflected by the DUT as a function of the second state of polarization; and
    an evaluation unit connected to the detector, for evaluating the optical return loss of the DUT as a function of the first and second states of polarization on the basis of the first and second detected reflected powers.

14. The apparatus of claim 13, wherein the first and second states of polarization are defined but changeable.

15. The apparatus of claim 13, further comprising:
    a reference to be used instead of the DUT, the reference having an at least approximately known optical return loss, for calibrating the measurement of the optical return loss by evaluating an optical return loss of the reference.

16. The apparatus of claim 15, wherein the optical return loss of the reference is at least 10 dB lower than the optical return loss of the DUT.

17. The apparatus of claim 13, further comprising:
    a termination to be used instead of the DUT, the termination having an at least approximately known optical minimum return loss, for performing a polarization dependent correction of the resulting optical return loss to compensate polarization dependent effects influencing the measurement result.

18. The apparatus of claim 17, wherein the optical return loss of the termination is at least 10 dB higher than the optical return loss of the DUT.

19. The apparatus of claim 13, further comprising:

a detector for monitoring an incident power of at least one of the first and second incident optical signals.

20. The apparatus of claim 13, further comprising:

a tunable light source for tuning a wavelength of at least one of the first and second incident optical signals when performing the measurement to be able to evaluate a wavelength dependent optical return loss of the DUT.

21. The apparatus of claim 13, further comprising:

a detector for monitoring a wavelength of at least one of the first and second incident optical signals.

22. The apparatus of claim 13, further comprising:

a detector for detecting a transmitted power of an optical signal transmitted by the DUT as a function of the first and second states of polarization, wherein the optical loss of the DUT in transmission is evaluated as a function of the first and second states of polarization on the basis of the detected transmitted power, for simultaneously performing a transmission measurement of an optical loss of the DUT in transmission.

* * * * *